US012666138B2

(12) United States Patent
Pfister et al.

(10) Patent No.: US 12,666,138 B2
(45) Date of Patent: Jun. 23, 2026

(54) MONITORING SYSTEM AND METHOD FOR MONITORING AT LEAST ONE TARGET OBJECT

(71) Applicant: Siemens Healthcare GmbH, Erlangen (DE)

(72) Inventors: Marcus Pfister, Bubenreuth (DE); Philipp Roser, Erlangen (DE)

(73) Assignee: Siemens Healthineers AG, Forchheim (DE)

( * ) Notice: Subject to any disclaimer, the term of this patent is extended or adjusted under 35 U.S.C. 154(b) by 0 days.

(21) Appl. No.: 18/209,096

(22) Filed: Jun. 13, 2023

(65) Prior Publication Data

US 2023/0421892 A1     Dec. 28, 2023

(30) Foreign Application Priority Data

Jun. 23, 2022    (DE) ..................... 10 2022 206 327.9

(51) Int. Cl.
  *H04N 23/60*        (2023.01)
  *G06T 17/00*        (2006.01)
      (Continued)

(52) U.S. Cl.
  CPC ............. *H04N 23/64* (2023.01); *G06T 17/00* (2013.01); *G06V 20/52* (2022.01); *H04N 7/181* (2013.01);
      (Continued)

(58) Field of Classification Search
  CPC ...... H04N 23/64; H04N 23/695; H04N 23/61; H04N 7/181; H04N 5/225;
      (Continued)

(56) References Cited

U.S. PATENT DOCUMENTS

| | | | | | |
|---|---|---|---|---|---|
| 4,710,819 A | * | 12/1987 | Brown | ................... | F16M 13/00 |
| | | | | | 348/157 |
| 5,224,426 A | * | 7/1993 | Rodnunsky | ............ | F16M 11/08 |
| | | | | | 104/238 |

(Continued)

FOREIGN PATENT DOCUMENTS

| | | |
|---|---|---|
| CN | 102117075 A | 7/2011 |
| CN | 104994271 A | 10/2015 |

(Continued)

OTHER PUBLICATIONS

Decision to Grant a Patent cited in corresponding German application No. 10 2022 206 327.9; Aug. 7, 2023; 8 pp.

(Continued)

*Primary Examiner* — Asmamaw G Tarko
(74) *Attorney, Agent, or Firm* — Lempia Summerfield Katz LLC

(57)     ABSTRACT

A monitoring system for monitoring at least one target object in a medical environment. The monitoring system includes a camera unit and a processing unit, wherein the camera unit comprises a suspension facility and a cable-suspended camera, wherein, the suspension facility comprises at least one cable and at least two cable mountings, wherein the cable mountings hold the at least one cable at a respective point in the room, wherein the suspension facility moreover comprises a camera mounting which holds the cable-suspended camera on the at least one cable, wherein the cable-suspended camera has a field of view and is configured so as to capture the field of view, wherein the cable-suspended camera may be re-positioned by moving the at least one cable with regard to the cable mountings and/or by moving the cable-suspended camera with regard to the at least one cable, wherein the processing unit is configured so as to control the cable-suspended camera in such a manner that in a first operational state of the monitoring system: the at least (Continued)

one target object is arranged in the field of view and the cable-suspended camera captures first image data having a map of the at least one target object.

13 Claims, 6 Drawing Sheets

(51) Int. Cl.

| | |
|---|---|
| *G06V 20/52* | (2022.01) |
| *H04N 7/18* | (2006.01) |
| *H04N 23/61* | (2023.01) |
| *H04N 23/695* | (2023.01) |

(52) U.S. Cl.
CPC .......... *H04N 23/61* (2023.01); *H04N 23/695* (2023.01); *G06V 2201/03* (2022.01)

(58) Field of Classification Search
CPC .......... H04N 2013/0074; H04N 5/222; H04N 5/2226; G06V 20/52; G06V 2201/03; G06T 17/00; G03B 15/00; G03B 17/561; B61B 7/04; G01S 17/89; G01S 17/93
USPC ................................................. 348/159, 143
See application file for complete search history.

(56) References Cited

U.S. PATENT DOCUMENTS

| | | | | |
|---|---|---|---|---|
| 5,225,863 | A * | 7/1993 | Weir-Jones | B66C 21/00 352/197 |
| 6,873,355 | B1 * | 3/2005 | Thompson | F16M 11/18 348/157 |
| 6,975,089 | B2 * | 12/2005 | Rodnunsky | B25J 9/0078 318/649 |
| 7,088,071 | B2 * | 8/2006 | Rodnunsky | F16M 11/18 318/649 |
| 7,239,106 | B2 * | 7/2007 | Rodnunsky | B25J 9/0078 318/649 |
| 7,625,314 | B2 * | 12/2009 | Ungari | G05D 1/0094 482/8 |
| 8,199,197 | B2 * | 6/2012 | Bennett | F16M 11/105 348/61 |
| 8,402,898 | B2 * | 3/2013 | Rodnunsky | B66C 21/00 212/76 |
| 9,063,390 | B2 * | 6/2015 | Wharton | G03B 15/00 |
| 9,337,949 | B2 * | 5/2016 | Wharton | H04B 10/25 |
| 9,477,141 | B2 * | 10/2016 | Wharton | F16M 11/425 |
| 10,099,368 | B2 * | 10/2018 | DelSpina | B25J 9/0078 |
| 10,103,813 | B2 * | 10/2018 | Wharton | H04B 10/25 |
| 10,369,693 | B1 * | 8/2019 | Levine | A01C 7/085 |
| 10,471,590 | B1 * | 11/2019 | Vachon | B25J 9/1623 |
| 10,941,024 | B2 * | 3/2021 | Khajepour | B25J 9/0078 |
| 11,345,017 | B2 * | 5/2022 | Flessas | B25J 15/0019 |
| 11,435,649 | B2 * | 9/2022 | Wharton | B61B 7/04 |
| 11,597,077 | B2 * | 3/2023 | Trigui | B25J 9/161 |
| 2002/0065461 | A1 | 5/2002 | Cosman | |
| 2006/0007300 | A1 | 1/2006 | Gafsou et al. | |
| 2006/0033463 | A1 * | 2/2006 | Rodnunsky | B25J 9/0078 318/649 |
| 2006/0107816 | A1 * | 5/2006 | Vinoly | G09B 15/00 84/47 |
| 2009/0066100 | A1 * | 3/2009 | Bosscher | B25J 17/0266 901/30 |
| 2009/0212269 | A1 * | 8/2009 | Murphy | B66C 17/04 254/338 |
| 2012/0211628 | A1 * | 8/2012 | Fisher | F16M 11/12 248/329 |
| 2014/0005555 | A1 * | 1/2014 | Tesar | A61B 1/0004 600/476 |
| 2014/0340487 | A1 * | 11/2014 | Gilliland | G01S 7/4863 348/48 |
| 2015/0297177 | A1 * | 10/2015 | Boctor | A61B 34/30 901/47 |
| 2016/0220324 | A1 * | 8/2016 | Tesar | A61B 90/20 |
| 2017/0193667 | A1 * | 7/2017 | Shotton | G06F 3/016 |
| 2017/0243157 | A1 * | 8/2017 | Piron | G16H 40/20 |
| 2018/0111265 | A1 * | 4/2018 | DelSpina | A61B 90/30 |
| 2019/0000564 | A1 * | 1/2019 | Navab | H04N 13/254 |
| 2019/0066314 | A1 * | 2/2019 | Abhari | G06T 7/33 |
| 2019/0090954 | A1 | 3/2019 | Kotian | |
| 2019/0098221 | A1 * | 3/2019 | Troy | H04N 7/18 |
| 2019/0380793 | A1 | 12/2019 | Abovitz et al. | |
| 2020/0134319 | A1 * | 4/2020 | Ranjan | G06T 7/74 |
| 2020/0237334 | A1 | 7/2020 | Koken | |
| 2021/0052348 | A1 * | 2/2021 | Schwägli | A61B 90/39 |
| 2021/0227019 | A1 | 7/2021 | Soon-shiong | |
| 2022/0361968 | A1 * | 11/2022 | Noonan | A61B 1/00149 |
| 2023/0078329 | A1 * | 3/2023 | Dalbert | A61B 34/30 382/103 |
| 2023/0114137 | A1 * | 4/2023 | Wu | A61B 34/20 |
| 2023/0181144 | A1 | 6/2023 | Sun | |
| 2023/0310099 | A1 * | 10/2023 | Ye | A61B 34/20 606/1 |
| 2023/0310103 | A1 * | 10/2023 | Noonan | A61B 46/10 |
| 2023/0310104 | A1 * | 10/2023 | Alvarez | A61B 90/361 606/1 |
| 2023/0363823 | A1 * | 11/2023 | Weede | A61B 34/20 |

FOREIGN PATENT DOCUMENTS

| | | |
|---|---|---|
| CN | 109567954 A | 4/2019 |
| CN | 111479509 A | 7/2020 |
| CN | 111789606 A | 10/2020 |
| CN | 112178365 A | 1/2021 |
| CN | 112704564 A | 4/2021 |
| DE | 102008046346 A1 | 3/2010 |
| DE | 202010013678 U1 | 12/2010 |
| DE | 102011084444 A1 | 4/2013 |
| EP | 4134966 A1 | 2/2023 |

OTHER PUBLICATIONS

Examination Report cited in corresponding German application No. 10 2022 206 327.9; Jul. 15, 2023; 14 pp.

* cited by examiner

MONITORING SYSTEM AND METHOD FOR MONITORING AT LEAST ONE TARGET OBJECT

CROSS REFERENCE TO RELATED APPLICATIONS

This application claims the benefit of DE 102022206327.9, filed on Jun. 23, 2022, which is hereby incorporated by reference in its entirety.

FIELD

Embodiments relate to a monitoring system for monitoring at least one target object in a medical environment.

BACKGROUND

In medical environments, for example in an operating room and/or an intervention room and/or an examination room, monitoring of large devices, for example an angiography system, plays an increasingly important role due to the increasing complexity, for example, with regard to collision avoidance. One possibility is the monitoring of the medical environment using two-dimensional (2D) or three-dimensional (3D) cameras and a derivation of collisions in corresponding model spaces. This often involves creating models of the medical environment in various ways, for example by 3D cameras or multiple 2D cameras. Depending on the design of the medical environment, this may result in dead or suboptimal camera angles, for example due to shadowing by representational objects in the medical environment, for example monitors. These dead or suboptimal camera angles may be compensated by additional cameras, but this leads to an increase of an algorithmic effort and a cost outlay.

Additionally, the arrangement of the multiple cameras, for example by tripods, may adversely affect laminar airflow in the medical environment.

BRIEF SUMMARY AND DESCRIPTION

The scope of the present invention is defined solely by the claims and is not affected to any degree by the statements within this summary. The present embodiments may obviate one or more of the drawbacks or limitations in the related art.

Embodiments render possible improved monitoring of a target object in a medical environment.

Embodiments relate in a first aspect to a monitoring system for monitoring at least one target object in a medical environment. The monitoring system includes a camera unit and a processing unit. The camera unit includes a suspension facility and a cable-suspended camera. The suspension facility includes at least one cable and at least two cable mountings. The cable mountings hold the at least one cable at a respective point in the room. The suspension facility includes a camera mounting which holds the cable-suspended camera on the at least one cable. The cable-suspended camera has a field of view and is configured so as to capture the field of view. The cable-suspended camera may be re-positioned by moving the at least one cable with regard to the cable mountings and/or by moving the cable-suspended camera with regard to the at least one cable. The processing unit is configured so as to control the cable-suspended camera in such a manner that in a first operational state of the monitoring system the at least one target object that is to be captured by the cable-suspended camera is arranged in the field of view and the cable-suspended camera captures first image data having a map of the at least one target object.

The at least one target object may include a medical object, for example a medical imaging device and/or a medical treatment device, for example a breathing device and/or a radiation system and/or an anesthesia machine, and/or a patient positioning apparatus and/or a protective device, for example a radiation shield, and/or an examination object, for example a human and/or animal patient and/or a medical operator.

The medical environment may include a spatial area within which a medical procedure, for example an examination and/or treatment of an examination object, may be performed, for example an operating theatre and/or an intervention room and/or an examination room. The medical environment may include a room that is enclosed at least in part, for example is fully enclosed. For example, the medical environment may include a spatial area that in comparison to a normal environment has increased hygiene requirements. The hygiene requirements may include, for example, a specification with regard to a minimum and/or average laminar air flow in the medical environment.

The suspension facility includes the at least one cable and the at least two cable mountings. The at least one cable may include a chain and/or a belt and/or a rope, for example a wire rope, and/or a tape. If the suspension facility includes multiple cables, the multiple cables may be configured at least in part, for example fully, identically, or differently. The cable mountings may be configured so as to hold the at least one cable, for example the multiple cables, at a respective point in the room. A cable mounting may be arranged in each case at one of multiple different points in the room and in each case may hold a cable at the point in the room. The cable mountings may be fastened at the respective point in the room in each case by a fastening device in each case, for example a screw and/or a nail. The points in the room may describe in each case a spatial position within the medical environment, for example on a ceiling and/or a wall. The points in the room may be arranged spaced apart from one another. Alternatively or additionally, the cable mountings may include a tripod and/or a robotic arm and/or a rail system. The cable mountings may be configured so as to hold the at least one cable, for example the multiple cables, at the respectively one point in the room in a fixed manner and/or in a movable manner. For this purpose, the at least one cable may be fastened to the at least two cable mountings by a further fastening device, for example a clip and/or a screw and/or a bolt and/or a clamp. Alternatively or additionally, the at least one cable may be held, for example mounted, in a movable manner by at least one of the cable mountings, for example two cable mountings. For this purpose, the at least two cable mountings may include a movement device, for example a roller and/or a drum and/or a wheel and/or a shear plate. The cable mountings may include a tensioning apparatus that may be configured so as to exert a predetermined mechanical tensioning force on the at least one cable that is held by the at least two cable mountings.

The camera mounting may be configured so as to hold the cable-suspended camera on the at least one cable, for example on the multiple cables. The camera mounting may be configured so as to hold the cable-suspended camera in a fixed manner with regard to the at least one cable and/or in a movable manner with regard to the at least one cable. For example, the camera mounting may hold the cable-suspended camera by a fastening device, for example by a clip and/or a screw and/or a bolt and/or a clamp in a fixed manner with regard to the at least one cable. Alternatively or additionally, the camera mounting may hold the cable-suspended camera by a movement device, for example a roller and/or a drum and/or a wheel and/or a shear plate, in a movable manner with regard to the at least one cable. The movement device may be configured for example as a slide, for example a rope slide.

The cable-suspended camera (also referred to as spider-cam) may include a 2D and/or 3D camera, for example a mono-camera and/or a stereo-camera and/or a depth camera. The field of view of the cable-suspended camera may describe a spatial capturing area of the cable-suspended camera, the spatial capturing area being limited, for example, by a capturing angle and/or a spatial resolution limit of the cable-suspended camera. The cable-suspended camera may be configured so as to capture, for example record, its field of view, for example its capturing area. For example, the cable-suspended camera may be configured so as to capture, for example record, image data having a map of the field of view.

The cable-suspended camera may be re-positioned by moving the at least one cable with regard to the cable mountings and/or by moving the cable-suspended camera with regard to the at least one cable. The re-positioning of the cable-suspended camera may include a change in the spatial position and/or orientation and/or pose of the cable-suspended camera with regard to the medical environment.

The at least one cable may be mounted, for example manually or in a motorized manner, in a movable manner with regard to the cable mountings. A movement in the same direction, for example translation, of the at least one cable with regard to the at least two cable mountings may render possible a translation of the cable-suspended cable that runs essentially in the same direction as the movement of the at least one cable. A movement in the opposite direction, for example translation, of the at least one cable with regard to the at least two cable mountings may render possible a translation of the cable-suspended camera that has a right-angled movement component with respect to the movement direction of the at least one cable.

Alternatively or additionally, the cable-suspended camera may be held by the camera mounting in a movable manner with regard to the at least one cable. The cable-suspended camera may be re-positioned by moving the camera mounting with regard to the at least one cable along the at least one cable.

The processing unit may be configured so as to control the re-positioning of the cable-suspended camera. The processing unit may be configured so as to control the movement of the camera mounting and/or the movement the cable mountings, for example by a signal. Alternatively or additionally, the processing unit may be configured so as to provide a workflow instruction, for example by a display apparatus and/or a loudspeaker, for manually re-positioning the cable-suspended camera. The cable-suspended camera may be configured so as to provide the captured image data, for example initial image data, to the processing unit. The initial image data may have a 2D and/or 3D spatially resolved map of the field of view of the cable-suspended camera. The initial image data may have a time resolved map of the field of view of the cable-suspended camera. Furthermore, the processing unit may be configured so as to evaluate the image data that has been captured by the cable-suspended camera, for example the initial image data. The processing unit may be configured so as to check whether the at least one target object is mapped, for example is not mapped or is in part mapped or is fully mapped, in the image data that has been captured by the cable-suspended camera, for example the initial image data.

The processing unit may be configured so as to control the cable-suspended camera, for example the movement the camera mounting and/or the movement the cable mountings, in such a manner that the at least one target object is arranged in field of view of the cable-suspended camera and the cable-suspended camera captures the first image data of the at least one target object. For this purpose, the processing unit may control the re-positioning of the cable-suspended camera based on the captured image data, for example the initial image data, in such a manner that the at least one target object is mapped at least in part, for example fully, in the captured image data. The cable-suspended camera may be configured so as to provide the captured image data, for example the initial image data, having the map of the at least one target object as the first image data. The first image data may have a 2D and/or 3D spatially resolved map of the at least one target object. The first image data may have a time resolved map of the field of view of the cable-suspended camera.

The monitoring system may render possible improved, for example comprehensive, monitoring of the at least one target object in the medical environment. The re-positionability of the cable-suspended camera renders it possible to avoid suboptimal or dead camera angles. For example, it may be rendered possible by the monitoring system to monitor in a flexible manner the at least one target object even in the case of different arrangements of the at least one target object in the medical environment. In addition, the laminar flow in the medical environment is only slightly influenced by the re-positionable cable-suspended camera.

In a further embodiment of the monitoring system, the cable-suspended camera may capture the first image data from a first mapping direction in the first operational state. The processing unit may be configured so as to control the cable-suspended camera in such a manner that in a further operational state of the monitoring system the at least one target object is arranged in the field of view of the cable-suspended camera and the cable-suspended camera captures further image data of the target object from a further mapping direction that is different from the first mapping direction and has a predetermined angle, for example a right angle, with regard to the first mapping direction. For example, the first and the further mapping direction may be perpendicular with respect to one another. The cable-suspended camera may be configured so as to provide the first and the further image data to the processing unit. Furthermore, the processing unit may be configured so as to re-construct a three-dimensional representation of the at least one target object with the aid of the first and the further image data.

The cable-suspended camera may capture the first image data from the first mapping direction in the first operational state. For example, the cable-suspended camera may be arranged in the first operational state in a first positioning, for example in a first spatial position and/or orientation and/or pose with regard to the at least one target object. The first mapping direction may characterize the orientation of the field of view of the cable-suspended camera in the first positioning.

The processing unit may be configured so as to control the cable-suspended camera, for example the movement the camera mounting and/or the movement the cable mountings, in such a manner that in the further operational state of the monitoring system the at least one target object is arranged in the field of view of the cable-suspended camera. The cable-suspended camera may capture the further image data of the at least one target object from the further mapping direction in the further operational state of the monitoring system. For example, the cable-suspended camera may be arranged in the further operational state in a further positioning, for example in a further spatial position and/or orientation and/or pose, with regard to the at least one target object, the further positioning being different from the first positioning. The further mapping direction may characterize the orientation of the field of view of the cable-suspended camera in the further positioning. In addition, the further mapping direction may be different from the first mapping direction and may have the predetermined angle, for example a right angle, with regard to the first mapping direction. For example, the further positioning may be arranged spaced apart from the first positioning. In addition, a point of intersection of the first and the further mapping direction may be arranged at or in the at least one target object. The processing unit may be configured so as to control the cable-suspended camera in such a manner that the cable-suspended camera is re-positioned from the first positioning into the further positioning or conversely, for example repeatedly and/or periodically. As a result, the first and the further image data may map the at least one target object in a stereoscopic manner.

The cable-suspended camera may be configured so as to provide the first and the further image data to the processing unit. The processing unit may be configured so as to re-construct the three-dimensional representation, for example a three-dimensional model, for example a volume mesh model and/or a skeletonized model, with the aid of the first and the further image data, for example with the aid of the stereoscopic map of the at least one target object in the first and the further image data. The re-construction of the three-dimensional representation of the at least one target object may include a segmentation in each case of a map of the at least one target object in the first and the further image data. In this case, image points for example pixels and/or voxels which map the at least one target object may be identified in the first and the further image data. The reconstruction of the 3D representation of the at least one target object may be based on a method of the type "structure-from-motion".

The embodiments may render possible a precise and cost-effective 3D capturing of the at least one target object by cable-suspended camera.

In an embodiment of the monitoring system, the camera unit may include at least a further camera. The further camera may have a further field of view and may be configured so as to capture the further field of view. In the first operational state of the monitoring system, the at least one further camera may be positioned in such a manner that the at least one target object is arranged in the further field of view. Furthermore, the further camera may capture further image data of the target object from a further mapping direction in the first operational state. The processing unit may control the cable-suspended camera in the first operational state of the monitoring system in such a manner that the cable-suspended camera captures the first image data from a first mapping direction that is different from the further mapping direction and has a predetermined angle, for example a right angle, with regard to the further mapping direction. In addition, the camera unit may be configured so as to provide the first and the further image data to the processing unit. The processing unit may be configured so as to re-construct a three-dimensional representation of the at least one target object with the aid of the first and the further image data.

The camera unit may include at least one further camera, for example multiple further cameras. The at least one further camera may be configured as a 2D and/or 3D camera, for example a mono-camera and/or a stereo-camera and/or a depth camera. The at least one further camera may have a further field of view. The further field of view may describe a spatial capturing area of the at least one further camera, the spatial capturing area being limited for example by a capturing angle and/or a spatial resolution limit of the at least one further camera. The at least one further camera may be configured so as to capture, for example record, the further field of view, for example the capturing area of the further camera. The at least one further camera may be configured so as to capture, for example record, further image data having a map of the further field of view. In the first operational state of the monitoring system, the at least one further camera may be positioned in such a manner that the at least one target object is arranged both in the field of view of the cable-suspended camera and also in the further field of view, for example simultaneously. The further mapping direction may be arranged for example parallel to, for example along, a longitudinal axis of the examination object, for example a patient axis.

The cable-suspended camera may capture the first image data from the first mapping direction in the first operational state. For example, the cable-suspended camera may be arranged in the first operational state in the first positioning, for example in a first spatial position and/or orientation and/or pose with regard to the at least one target object. The first mapping direction may characterize the orientation of the field of view of the cable-suspended camera in the first positioning. The at least one further camera may capture the further image data from the further mapping direction in the first operational state. For example, the at least one further camera may be arranged in the first operational state in a further positioning, for example in a further spatial position and/or orientation and/or pose with regard to the at least one target object. The first and the further positioning may be different, for example spaced apart. The further mapping direction may characterize the orientation of the further field of view of the at least one further camera in the further positioning. In addition, the first mapping direction may be different from the further mapping direction and may have the predetermined angle, for example a right angle, with regard to the further mapping direction. For example, the first and the further mapping direction may be perpendicular with respect to one another. In addition, a point of intersection of the first and the further mapping direction may be arranged at or in the at least one target object. The first and the further image data may map the at least one target object in a stereoscopic manner. In addition, the first and the further image data may map the at least one target object simultaneously.

The camera unit, for example the cable-suspended camera and the at least one further camera, may be configured so as to provide the first and the further image data to the processing unit. The processing unit may be configured so as to re-construct the three-dimensional representation, for example a three-dimensional model, for example a volume mesh model and/or a skeletonized model, with the aid of the first and the further image data, for example with the aid of the stereoscopic image of the at least one target object in the first and the further image data. The re-construction of the three-dimensional representation of the at least one target object may include a segmentation in each case of a map of the at least one target object in the first and the further image data. In this case, image points for example pixels and/or voxels that map the at least one target object may be identified in the first and the further image data.

The, for example, simultaneous capturing of the at least one target object from the first and the further mapping direction may render possible a precise and simultaneously flexible 3D capturing of the at least one target object.

In an embodiment of the monitoring system, the suspension facility may include multiple cables and at least three cable mountings. The cable mountings may hold the multiple cables at a respective point in the room. The camera mounting may hold the cable-suspended camera on the multiple cables. Furthermore, the cable-suspended camera may be re-positioned by moving at least one of the multiple cables with regard to the cable mountings and/or by moving the cable-suspended camera with regard to at least one of the multiple cables.

The multiple cables may be configured at least in part, for example fully, identically, or differently. The suspension facility may include at least three cable mountings, for example in each case two cable mountings for each of the multiple cables. The at least three cable mountings may hold the multiple cables at a respective point in the room. For example, in each case two cable mountings may hold one of the multiple cables at two different points in the room. The multiple cables may be held by the at least three cable mountings in such a manner that the multiple cables intersect at the camera mounting.

At least one of the multiple cables, for example each of the multiple cables, may be mounted in a movable manner with regard to the cable mountings. Movement in the same direction or in the opposite direction, for example translation, of the at least one of the multiple cables with regard to the cable mountings may render possible a translation of the cable camera. Alternatively or additionally, the cable camera may be held by the camera mounting in a movable manner with regard to at least one of the multiple cables, for example in a movable manner with regard to each of the multiple cables. The cable-suspended camera may be re-positioned along the at least one cable by moving the camera mounting with regard to the at least one cable. For example, the cable-suspended camera may be re-positioned by moving one or multiple cables for example simultaneously with regard to the respective cable mountings and/or by moving the camera mounting for example simultaneously with regard to one or multiple cables.

The embodiments may render possible a three-dimensional re-positioning of the cable camera at least along the multiple cables. This may render it possible to capture the at least one target object in a particularly flexible manner.

In an embodiment of the monitoring system, the camera mounting may hold the cable-suspended camera on the at least one cable in a rotatable manner and/or in a pivotable manner with regard to the at least one cable.

The camera mounting may be configured so as to hold the cable-suspended camera in a rotatable manner, for example so as to be able to rotate about one or multiple rotational axes, and/or in a pivotable manner, for example so as to be able to tilt, on the at least one cable. For example, the cable-suspended camera may be held manually, for example by a medical operator, rotatable and/or pivotable by the camera mounting on the at least one cable. Alternatively or additionally, the camera mounting may be configured so as to rotate and/or to pivot the cable-suspended camera automatically, for example robotically. The processing unit may be configured so as to control the rotating and/or the pivoting of the cable-suspended camera. Alternatively or additionally, the camera mounting may have a cardanic suspension facility, (also referred to as gimbal), that holds the cable-suspended camera on the at least one cable. The camera mounting may be configured so as to compensate a position change of the cable-suspended camera with regard to a reference position, for example a horizontal line, by rotating and/or pivoting the cable-suspended camera, for example automatically. The camera mounting may be configured so as to rotate and/or pivot the cable-suspended camera in such a manner that the at least one target object is arranged in the field of view of the cable-suspended camera, for example also in the case of a movement of the cable-suspended camera with regard to the at least one target object.

The embodiments may render it possible to capture the at least one target object in a flexible manner.

In an embodiment of the monitoring system, the camera unit may be configured so as to provide the captured image data to the processing unit. The processing unit may be configured so as with the aid of the image data to identify a phase of a medical procedure that is mapped in the image data. The processing unit may be configured so as to control the re-positioning of the cable-suspended camera additionally in dependence upon the identified phase.

Providing the captured image data may include transmitting the first and/or the further image data from the camera unit, for example the cable-suspended camera and/or the at least one further camera, to the processing unit. The processing unit may be configured so as, with the aid of the image data, for example with the aid of a mapping of the at least one target object and/or further objects, for example medical objects and/or an examination object and/or a medical operator in the image data, to identify the phase of the medical procedure. The phase of the medical procedure may describe a temporal section of a procedural flow that includes multiple phases. The processing unit may be configured for example so as to receive a treatment plan having information regarding the procedural flow, for example the multiple phases. The information regarding the treatment plan may include for example information regarding positioning, for example spatial position and/or orientation and/or pose, of the at least one target object and/or of the further objects and/or of the medical operator for the multiple phases. With the aid of the image data, the processing unit may determine the instantaneous positioning of the at least one target object and/or of the further objects and/or of the medical operator, for example by object recognition and/or pattern recognition and/or segmentation. The processing unit may determine with the aid of the image data an instantaneous relative positioning of the at least one target object and/or of the further objects and/or of the medical operator. The processing unit may compare the specific positioning and/or the specific relative positioning with the positioning predetermined in the treatment plan and identify the instantaneous phase of the medical procedure.

The processing unit may be configured so as to control the re-positioning of the cable-suspended camera additionally in dependence upon the identified phase. For example, the treatment plan may specify a mapping direction and/or positioning for the cable-suspended camera for capturing the at least one target object in the identified phase and/or in a subsequent phase. Alternatively, the treatment plan may exclude spatial positions and/or a spatial area for arranging the cable-suspended camera in the identified phase, for example so as to avoid a collision. The processing unit may control the re-positioning of the cable-suspended camera in such a manner in dependence upon the identified phase that the at least one target object is arranged in the field of view of the cable-suspended camera and the cable-suspended camera is additionally arranged at the predetermined position and/or at none of the excluded positions and/or captures the at least one target object from the predetermined mapping direction. Alternatively or additionally, the processing unit may be configured so as with the aid of the identified phase to determine the at least one target object that is to be captured. For example, in the case of one phase of a planned 3D scan of the examination object, the medical imaging device may be determined to be the at least one target object, and a spatial area of a planned trajectory of the medical imaging device may be arranged within the field of view of the cable-suspended camera. Moreover, in a further phase of a relocation and/or a movement of the medical imaging device from a parked position, another spatial area may be arranged within the field of view of the cable-suspended camera.

The embodiments may render it possible to detect the at least one target object in a manner adapted to the detected phase of the medical procedure. As a result, collisions and/or limitations during the medical procedure may be prospectively minimized or avoided.

In an embodiment of the monitoring system, the camera unit may be configured so as to provide the captured image data to the processing unit. The processing unit may be configured so as to identify further objects that are mapped in the image data, and to control the re-positioning of the cable-suspended camera in a collision-free manner with regard to the further objects.

Providing the captured image data may include transmitting the first and/or the further image data from the camera unit, for example the cable-suspended camera and/or the at least one further camera, to the processing unit. The processing unit may be configured so as to identify the at least one target object and the at least one further object, for example multiple further objects, in the image data. For example, the processing unit may be configured so as to identify a map of the at least one target object and a map of the at least one further object in the image data, for example the first and/or the further image data, for example by object recognition and/or pattern recognition and/or segmentation. The at least one further object may include for example a medical object and/or an examination object and/or a medical operator. The processing unit may be configured so as with the aid of the image data, for example with the aid of a map of the at least one target object in the image data, to determine an instantaneous positioning, for example a spatial position and/or orientation and/or pose, of the at least one target object. The processing unit may be configured so as with the aid of the image data, for example with the aid of a map of the at least one further object in the image data, to determine the instantaneous positioning of the at least one further object. For example, the processing unit may determine with the aid of the image data an instantaneous relative positioning of the at least one target object and of the at least one further object.

The processing unit may be configured so as with the aid of the identified at least one further object, for example with the aid of the positioning of the at least one further object, to control the re-positioning of the cable-suspended camera in a collision-free manner. The processing unit may plan a path, for example, for re-positioning the cable-suspended camera, the path running spaced apart from the positioning of the at least one further object, for example spaced apart from the positioning of the multiple further objects.

The embodiments may render possible a collision-free re-positioning of the cable-suspended camera, for example with regard to the at least one target object and the at least one further object so as to capture the at least one target object.

In an embodiment of the monitoring system, the processing unit may be configured so as to control the cable-suspended camera in such a manner that at least in the first operational state of the monitoring system multiple target objects that are to be captured by the cable-suspended camera are arranged in the field of view and the cable-suspended camera captures the first image data having a map of the multiple target objects.

The multiple target objects may be configured at least in part, for example fully, differently, or identically. The multiple target objects may be arranged at least in part adjacent to or spaced apart from one another in the medical environment. In addition, the multiple target objects may be at least partially moveable. The processing unit may control the cable-suspended camera, for example the re-positioning of the cable-suspended camera, in such a manner that at least in the first operational state the multiple target objects are arranged for example simultaneously in the field of view of the cable-suspended camera. As a result, the cable-suspended camera may capture the first image data having the map of the multiple target objects. The processing unit may be configured so as to receive information regarding the multiple target objects, for example geometric features, for example a form and/or contour and/or a visually noticeable characteristic, for example a pattern and/or a marker structure. The processing unit may be configured so as with the aid of the information regarding the multiple target objects in the image data that has been captured by the cable-suspended camera, for example the initial image data, to check whether the multiple target objects are arranged in the field of view of the cable-suspended camera. For example, the processing unit may be configured so as to identify a map of the geometric features and/or of the visually noticeable characteristic in the initial image data. The processing unit may re-position the cable-suspended camera, for example repeatedly, in such a manner that the multiple target objects are arranged in the field of view of the cable-suspended camera, and they may be mapped in the first image data.

Embodiments may render it possible to capture multiple target objects in the medical environment in an improved manner.

In an embodiment of the monitoring system, the camera unit may be configured so as to provide the captured image data to the processing unit. The processing unit may be configured so as to determine a collision probability between the multiple target objects with the aid of the image data and provide a signal in dependence upon the collision probability.

Providing the captured image data may include transmitting the first and/or the further image data from the camera unit, for example the cable-suspended camera and/or the at least one further camera, to the processing unit. The camera unit may be configured so as to capture the image data repeatedly and/or continuously. For example, the cable-suspended camera may be configured so as to capture the first and/or the further image data repeatedly and/or continuously. The at least one further camera may be configured so as to capture the further image data repeatedly and/or continuously. In this case, a movement of at least one of the multiple target objects may be mapped, for example in a time resolved manner, in the image data, for example in the first and/or the further image data. The processing unit may be configured so as to determine the relative positioning of the multiple target objects with the aid of the image data, for example with the aid of the map of the multiple target objects in the image data. For this purpose, the processing unit may be configured so as to identify a map of the multiple target objects in the image data, for example in the first and/or the further image data, for example by object recognition and/or pattern recognition and/or segmentation.

The processing unit may be configured so as to determine a relative movement of the multiple target objects with the aid of the image data, for example with the aid of the movement of the multiple target objects, the movement being mapped in the image data. Alternatively, or additionally, the processing unit may be configured so as to receive an operational parameter of at least of one of the multiple target objects. The operational parameter may have information regarding an instantaneous movement direction and/or movement speed of the at least one target object. The processing unit may be configured so as to determine the relative movement of the multiple target objects with the aid of the image data, for example with the aid of the relative positioning of the at least one target object with regard to the other target objects, and the operational parameter. The processing unit may determine the collision probability, for example a probability value of a collision and/or approach, between the multiple target objects with the aid of the image data, for example with the aid of the relative movement of the multiple target objects. The processing unit may be configured so as to provide the signal in dependence upon the collision probability, the signal for example having information regarding the collision probability, for example the probability value. Providing the signal may include storing on a computer-readable storage medium and/or displaying on a display unit and/or transmitting to one of the multiple target objects. Moreover, providing the signal may include outputting a workflow message to the medical operator, for example an acoustic and/or visual and/or haptic signal.

By monitoring the multiple target objects and providing the signal in dependence upon the collision probability, the embodiments may prevent a collision between the multiple target objects.

In an embodiment of the monitoring system, at least one of the multiple target objects may include a moveable medical object. The processing unit may be configured so as to provide the signal to the moveable medical object and to control a movement of the moveable medical object by the signal.

At least one of the multiple target objects may include a movable medical object, for example a patient positioning apparatus and/or a medical imaging device and/or a medical treatment device. The processing unit may be configured so as to provide the signal to the moveable medical object. The processing unit may be configured so as to control the movement of the medical object by the signal. For example, the processing unit may be configured so as to adapt an instantaneous movement, for example a movement direction and/or movement speed, of the medical object in dependence upon the collision probability in such a manner that the collision probability is reduced. Adapting the movement of the medical object in dependence upon the collision probability may include, for example, braking and/or swerving.

The embodiments may render it possible to safely avoid collision between the multiple target objects.

In an embodiment of the monitoring system, the medical environment may include a room. The at least one target object may be arranged in the room in one operational state of the monitoring system, for example in the first and/or the further operational state of the monitoring system. The cable mountings may be fastened to a side wall and/or ceiling of the room.

The room may include at least one, for example multiple, side walls and a ceiling, for example a room ceiling. For example, the room may be delimited by the at least one side wall and the room ceiling. The at least one target object may be arranged in the room in one operational state of the monitoring system, for example in the first and the further operational state. In addition, the cable mountings may be fastened to the at least one side wall, for example to a common side wall or to different side walls. Alternatively or additionally, the cable mountings may be fastened to the ceiling of the room, for example to the corner points of a rectangle.

This may render possible precise and flexible monitoring of the at least one target object, for example without hampering a medical procedure within the medical environment.

Embodiments further relate in a second aspect to a method for monitoring at least one target object by a monitoring system. First image data having a map of the at least one target object is captured and made available. Capturing the first image data may include multiple steps. In a first step a), initial image data of the field of view of the cable-suspended camera is captured by the cable-suspended camera. In a second step b), a check is performed with the aid of the initial image data as to whether the at least one target object is arranged within the field of view. If the answer is in the negative, the cable-suspended camera is re-positioned and the steps a) and b) are repeated. If the answer is positive, the initial image data is provided as the first image data.

The advantages of the method correspond essentially to the advantages of the monitoring system. Features, advantages, or alternative embodiments mentioned in this case may likewise also be transferred to other claimed subjects and conversely.

The initial image data may have a 2D and/or 3D spatially resolved map of the field of view of the cable-suspended camera. Additionally, the initial image data may be time resolved. In step b), it is possible to check whether the at least one target object is arranged within the field of view of the cable-suspended camera. For example, it is possible in step b) to check whether the initial image data has a map of the at least one target object. The check in step b) may include, for example, applying object recognition and/or pattern recognition and/or segmentation to the initial image data. If the answer is in the negative, for example in the case of an arrangement of the at least one target object outside the field of view of the cable-suspended camera, the cable-suspended camera may be re-positioned. Moreover, if the answer is in the negative, the steps a) and b) may be repeated, for example as long as the at least one target object is arranged in the field of view of the cable-suspended camera and/or until a predetermined number of repetitions is achieved. If the answer is in the positive, for example in the case of an arrangement of the at least one target object in the field of view of the cable-suspended camera, the initial image data may be provided as the first image data.

Providing the initial image data as the first image data may include storing on a computer-readable storage medium and/or displaying on a display unit. For example, providing the initial image data may include displaying a graphic representation of the initial image data.

In an embodiment of the method, the first image data may be captured from a first mapping direction by the cable-suspended camera. The cable-suspended camera may be arranged in a first positioning during the capture of the first image data. The cable-suspended camera may be re-positioned from the first positioning into a further positioning. In the further positioning, the at least one target object may be arranged in the field of view of the cable-suspended camera. In addition, further image data of the target object may be captured in the further positioning by the cable-suspended camera from a further mapping direction that is different from the first mapping direction and has a predetermined angle, for example a right angle, with regard to the first mapping direction. A three-dimensional representation of the at least one target object may be re-constructed with the aid of the first and the further image data. In this case, providing may include additionally providing the three-dimensional representation of the at least one target object.

In an embodiment of the method, further image data of the at least one target object may be captured by a further camera from a further mapping direction. The cable-suspended camera may be positioned so as to capture the first image data in such a manner that the cable-suspended camera captures the first image data from a first mapping direction that is different from the further mapping direction and has a predetermined angle, for example a right angle, with regard to the further mapping direction. A three-dimensional representation of the at least one target object may be re-constructed with the aid of the first and the further image data. In this case, providing may include additionally providing the three-dimensional representation of the at least one target object.

In an embodiment of the method, it is possible with the aid of the image data to identify a phase of a medical procedure that is mapped in the image data. The cable-suspended camera may be re-positioned additionally in dependence upon the identified phase.

In an embodiment of the method, the cable-suspended camera may be positioned in such a manner that multiple target objects that are to be captured are arranged in the field of view of the cable-suspended camera. The first image data including a map of the multiple target objects may be captured. Furthermore, a collision probability between the multiple target objects may be determined with the aid of the image data. In this case, a signal may be provided depending upon the collision probability.

Embodiments relate in a third aspect to a computer program product including a computer program that may be loaded directly into a storage device of a processing unit, including program steps in order to perform all the steps of a method for monitoring at least one target object if the program steps are performed by the processing unit.

Embodiments may relate to a computer-readable storage medium on which are stored program steps that may be read and performed by a processing unit in order to perform all the steps of the method for monitoring at least one target object if the program steps are performed by the processing unit.

A software-based realization has the advantage that processing units already in use may be easily retrofitted by a software update. Such a computer program product may include, in addition to the computer program, where appropriate additional components, such as for example documentation and/or additional components, as well as hard-ware components, such as for example hardware keys (dongles, etc.) for using the software.

DETAILED DESCRIPTION

Figure 1:
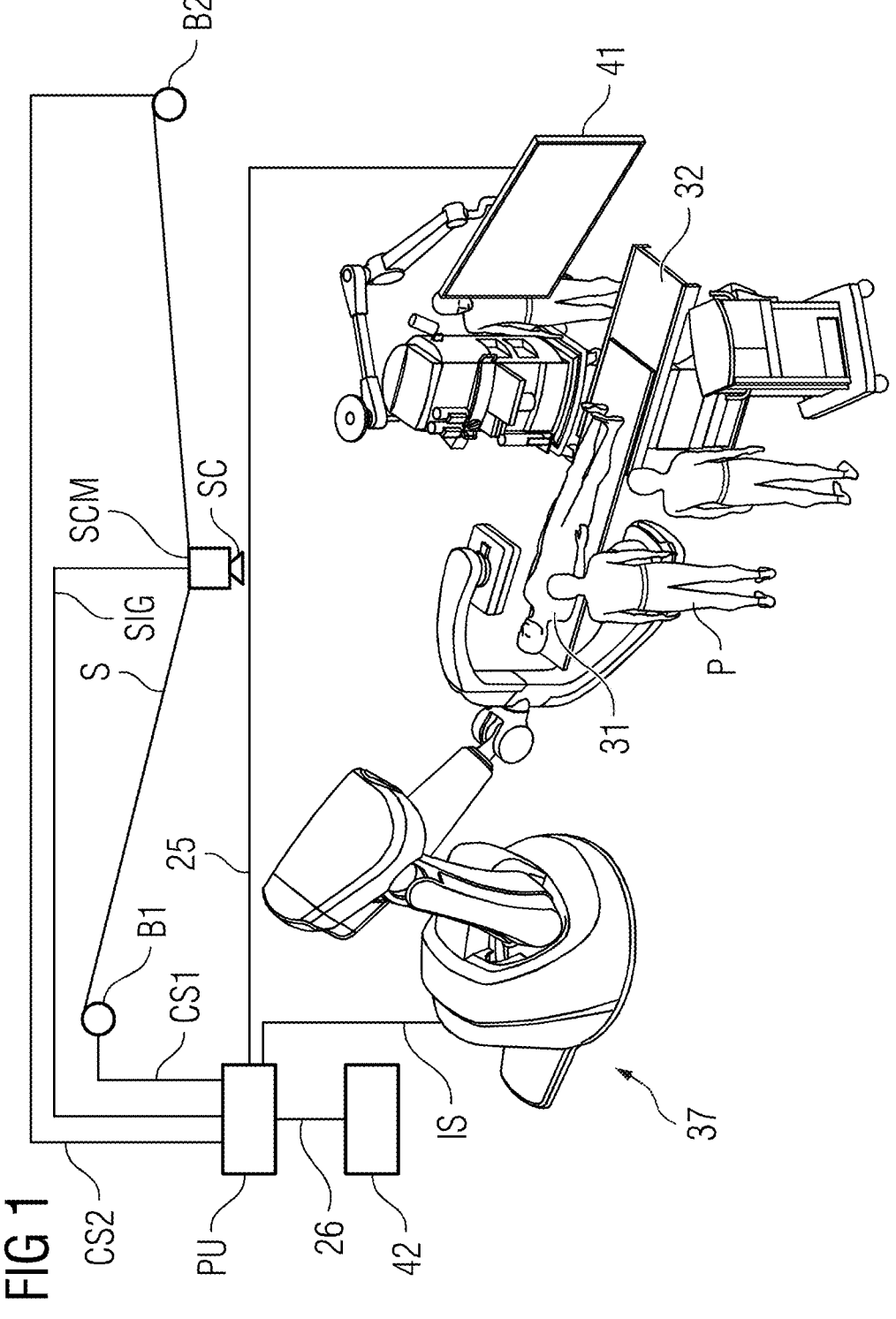
FIGS. 1 and 2 depict schematic representations of different embodiments of a monitoring system.

FIG. 1 depicts a schematic representation of an embodiment of a monitoring system for monitoring at least one target object in a medical environment. The at least one target object may include, for example, a medical imaging device, for example a medical C-arm X-ray device 37, and/or an examination object 31, that is arranged on a patient positioning apparatus 32, and/or a medical operator P. The monitoring system may include a camera unit and a processing unit PU. The camera unit may include a suspension facility and a cable-suspended camera SC. The suspension facility may include a cable S and at least two cable mountings B1 and B2. The cable mountings B1 and B2 may hold the at least one cable S at a respective point in the room. The suspension facility may moreover include a camera mounting SCM that holds the cable-suspended camera SC on the at least one cable S. The cable-suspended camera SC may have a field of view and may be configured so as to capture the field of view. The cable-suspended camera SC may be re-positioned by moving the at least one cable S with regard to the cable mountings B1 and B2 and/or by moving the cable-suspended camera SC with regard to the at least one cable S. The processing unit PU may be configured so as to control the cable mountings B1 and B2 by respectively a signal CS1 and CS2 so as to move the cable S. The processing unit PU may be configured so as by a signal SIG to control a movement of the camera mounting SCM, for example the cable-suspended camera SC, with regard to the cable S. The processing unit PU may be configured so as to control the cable-suspended camera SC in such a manner that in a first operational state of the monitoring system the at least one target object that is to be captured by the cable-suspended camera SC is arranged in the field of view and the cable-suspended camera SC captures first image data having a map of the at least one target object.

The monitoring system may have an input unit 42, for example a keypad, and a display unit 41, for example a monitor and/or a display and/or a projector. The input unit 42 may be integrated into the display unit 41, for example in the case of a capacitive and/or resistive input display. The input unit 42 may be configured so as to capture an input of the medical operator P. For this purpose, the input unit 42 may transmit a signal 26, for example, to the processing unit PU. The processing unit PU may be configured so as to control the medical C-arm X-ray device 37 and/or the cable-suspended camera SC in dependence upon the input, for example in dependence upon the signal 26. The display unit 41 may be configured so as to display a graphic representation of the image data that is captured by the cable-suspended camera SC. For this purpose, the processing unit PU may transmit a signal 25 to the display unit 41.

The cable-suspended camera SC may capture the first image data from a first mapping direction in the first operational state. The processing unit PU may be configured so as to control the cable-suspended camera SC in such a manner that in a further operational state of the monitoring system the at least one target object is arranged in the field of view of the cable-suspended camera SC and the cable-suspended camera SC captures further image data of the target object from a further mapping direction that is different from the first mapping direction and has a predetermined angle, for example a right angle, with regard to the first mapping direction. Furthermore, the cable-suspended camera SC may be configured so as to provide the first and the further image data to the processing unit PU. The processing unit PU may be configured so as to re-construct a three-dimensional representation of the at least one target object with the aid of the first and the further image data.

The camera mounting SCM may hold the cable-suspended camera SC on the at least one cable S in a rotatable manner and/or in a pivotable manner with regard to the at least one cable S. Furthermore, the camera unit may be configured so as to provide the captured image data to the processing unit PU. The processing unit PU may be configured so as with the aid of the image data to identify a phase of a medical procedure that is mapped in the image data. In addition, the processing unit PU may be configured so as to control the re-positioning of the cable-suspended camera SC additionally in dependence upon the identified phase.

The processing unit PU may be configured so as to control the cable-suspended camera SC in such a manner that at least in the first operational state of the monitoring system multiple target objects that are to be captured by the cable-suspended camera SC are arranged in the field of view and the cable-suspended camera SC captures the first image data having a map of the multiple target objects. The camera unit may be configured so as to provide the captured image data to the processing unit PU. The processing unit PU may be configured so as to determine a collision probability between the multiple target objects with the aid of the image data and to provide a signal IS in dependence upon the collision probability.

At least one of the multiple target objects, for example the medical imaging device 37, may be moveable. The processing unit PU may be configured so as to provide the signal to the moveable medical imaging device 37 and to control a movement of the moveable medical imaging device 37 by the signal IS.

Figure 2:
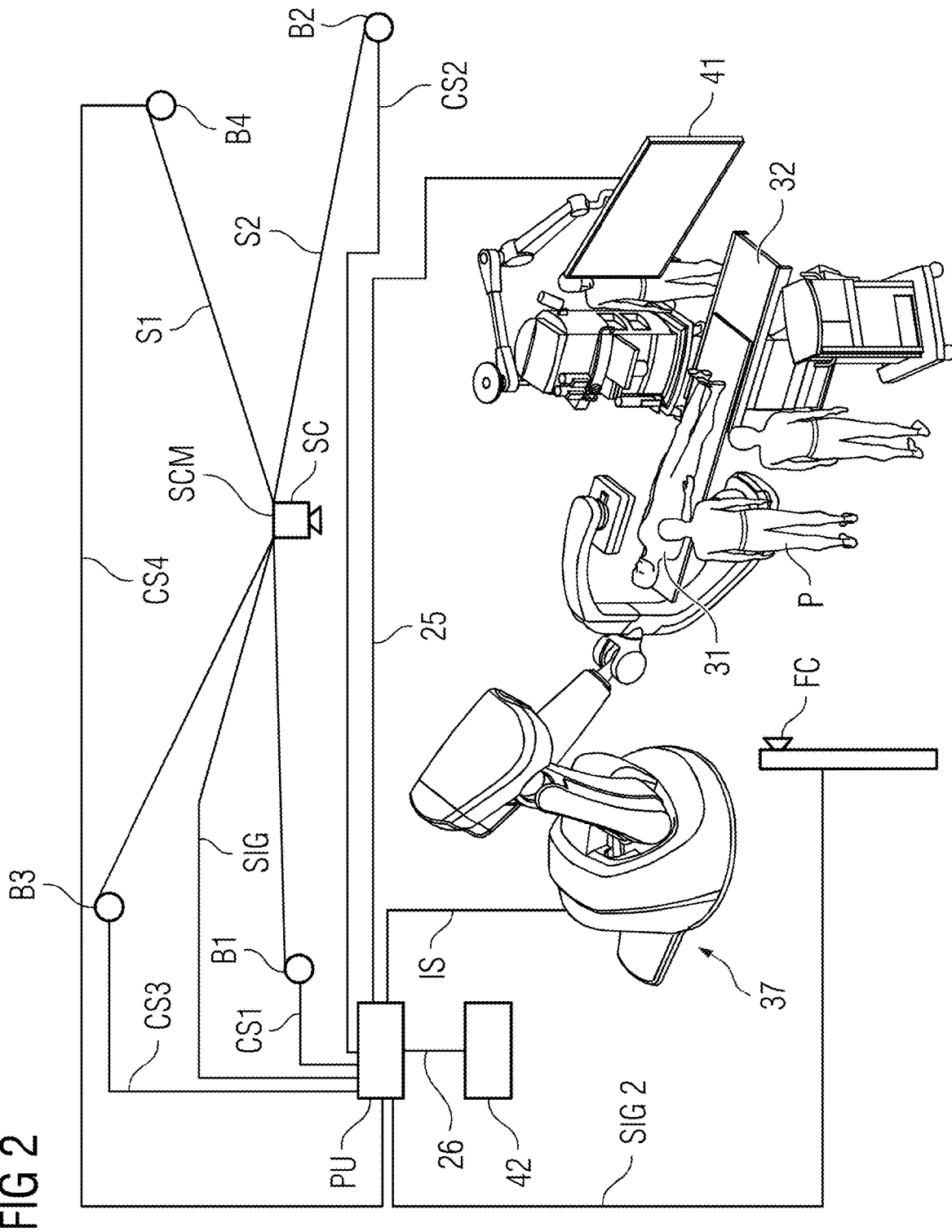

FIG. 2 depicts a schematic representation of an embodiment of a monitoring system. The suspension facility may include multiple, for example two, cables S1 and S2 and at least three, for example four, cable mountings B1 to B4. The cable mountings B1 to B4 may hold the multiple cables S1 and S2 at a respective point in the room. The camera mounting SCM may hold the cable-suspended camera SC on the multiple cables S1 and S2. The cable-suspended camera SC may be re-positioned by moving at least one of the multiple cables S1 and S2 and/or by moving the cable-suspended camera SC with regard to at least one of the multiple cables S1 and S2. The processing unit PU may be configured so as to control the cable mountings B1 to B4 by respectively a signal CS1 to CS4 so as to move the cable S1 and S2.

The camera unit may include at least one further camera FC. The further camera FC may have a further field of view and may be configured so as to capture the further field of view. In the first operational state of the monitoring system, the at least one further camera FC may be positioned in such a manner that the at least one target object is arranged in the further field of view. The further camera FC may capture further image data of the target object from a further mapping direction in the first operational state. The processing unit PU may control the cable-suspended camera SC in the first operational state in such a manner that the cable-suspended camera SC captures the first image data from a first mapping direction that is different from the further mapping direction and has a predetermined angle, for example a right angle, with regard to the further mapping direction. Furthermore, the camera unit may be configured so as to provide the first and the further image data to the processing unit PU. For example, the at least one further camera FC may be configured so as to provide the further image data by a signal SIG2 to the processing unit PU. The processing unit PU may be configured so as to re-construct a three-dimensional representation of the at least one target object with the aid of the first and the further image data. The display unit 41 may be configured so as to display a graphic representation of the further image data and/or of the 3D representation of the at least one target object.

The processing unit PU may be configured so as to identify further objects that are mapped in the image data, and to control the re-positioning of the cable-suspended camera SC in a collision-free manner with regard to the further objects.

The medical environment may include a room. The at least one target object may be arranged in one operational state of the monitoring system in the room. In addition, the cable mountings B1 to B4 may be fastened to a side wall and/or ceiling of the room.

Figure 3:
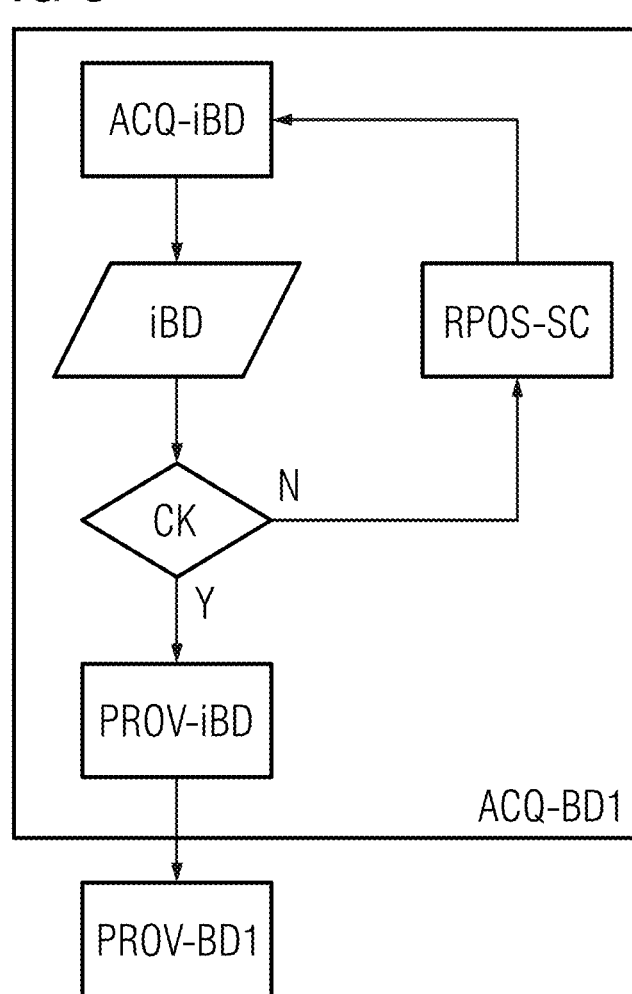
FIGS. 3, 4, 5, and 6 depict schematic representations of different embodiments of a method for monitoring at least one target object.

FIG. 3 depicts a schematic representation of an embodiment of a method for monitoring at least one target object by a monitoring system. The first image data BD1 having a map of the at least one target object may be captured ACQ-BD1 and provided PROV-BD1. Capturing ACQ-BD1 of the first image data BD1 may include multiple steps. In a first step a), initial image data iBD of the field of view of the cable-suspended camera SC may be captured ACQ-iBD by the cable-suspended camera SC. In a second step b), a check may be performed CK with the aid of the initial image data iBD as to whether the at least one target object is arranged within the field of view. If the answer is in the negative N, the cable-suspended cameras SC may be re-positioned RPOS-SC and the steps a) and b) may be repeated. If the answer is in the positive Y, the initial image data iBD may be provided PROV-iBD as the first image data.

Figure 4:
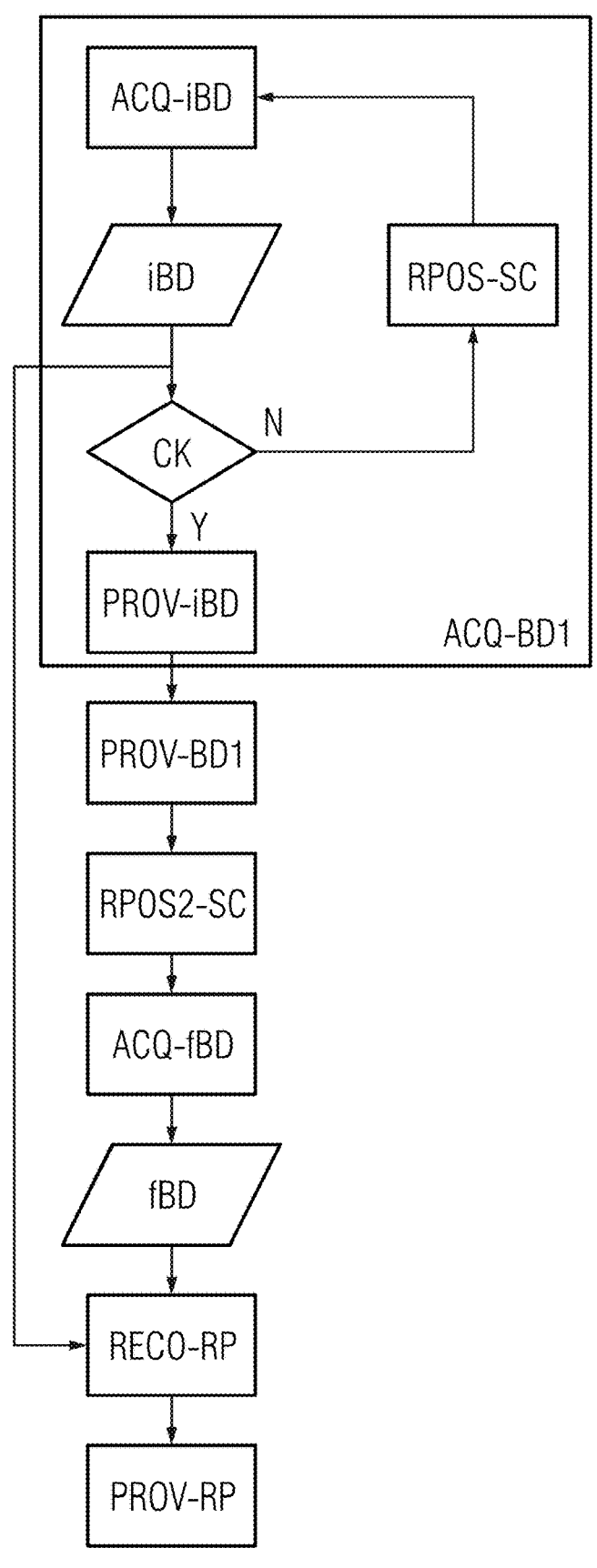

FIG. 4 depicts a schematic representation of an embodiment of a method for monitoring at least one target object. The first image data may be captured from a first mapping direction by the cable-suspended camera SC. The cable-suspended camera SC may be arranged in a first positioning during the capture of the first image data. The cable-suspended camera may be re-positioned RPOS2-SC from the first positioning into a further positioning. In this case, in the further positioning the at least one target object may be arranged in the field of view of the cable-suspended camera SC and further image data fBD of the target object may be captured ACQ-fBD by the cable-suspended camera SC from a further mapping direction that is different from the first mapping direction and has a predetermined angle, for example a right angle, with regard to the first mapping direction. In addition, a three-dimensional representation of the at least one target object may be re-constructed RECO-RP with the aid of the first and the further image data fBD. Providing may include providing the 3D representation of the at least one target object PROV-RP.

Figure 5:
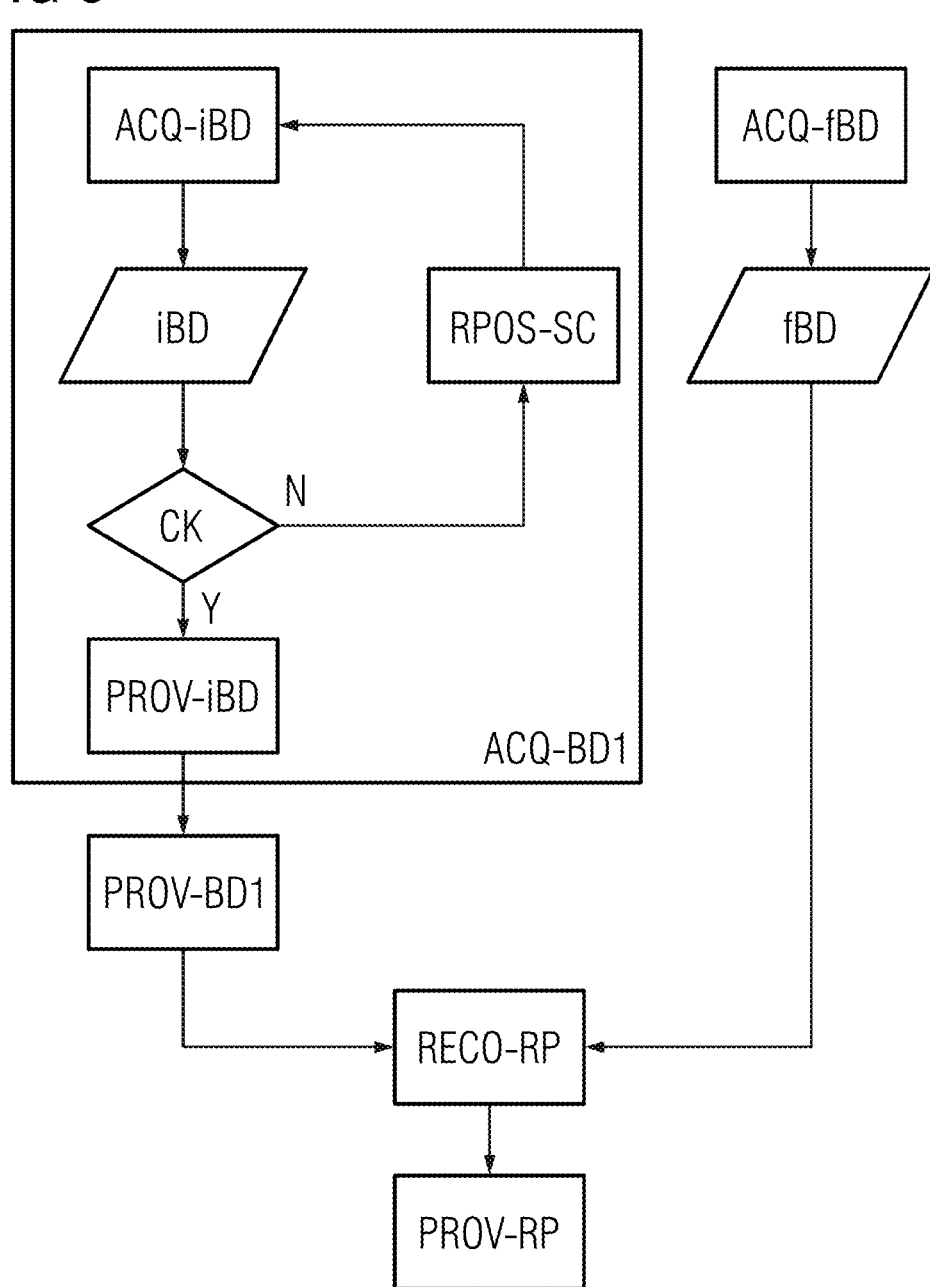

FIG. 5 depicts a schematic representation of an embodiment of a method for monitoring a target object. In this case, further image data fBD having a map of the at least one target object may be captured ACQ-fBD from a further mapping direction. The cable-suspended camera SC may be positioned so as to capture the first image data in such a manner that the cable-suspended camera captures the first image data from a first mapping direction that is different from the further mapping direction and has a predetermined angle, for example a right angle, with regard to the further mapping direction. In addition, a 3D representation of the at least one target object may be re-constructed RECO-RP with the aid of the first image data BD1 and the further image data fBD.

Figure 6:
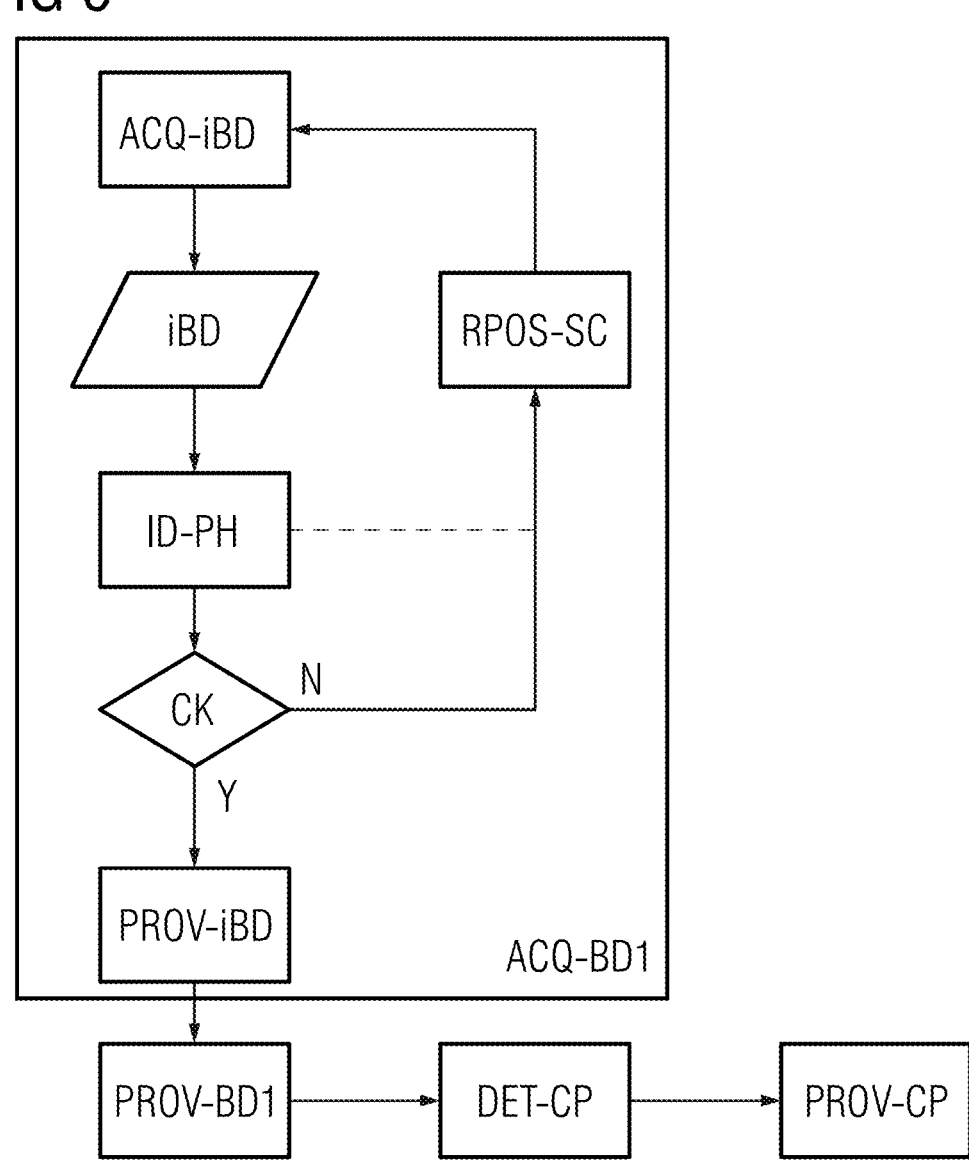

FIG. 6 depicts a schematic representation of an embodiment of a method for monitoring a target object. In this case, it is possible with the aid of the image data to identify ID-PH a phase of a medical procedure, that is mapped in the image data. The cable-suspended camera SC may be re-positioned RPOS-SC additionally in dependence upon the identified phase.

The cable-suspended camera SC may be re-positioned RPOS-SC in such a manner that multiple target objects that are to be captured are arranged in the field of view of the cable-suspended camera SC. The first image data having a map of the multiple target objects may be captured. Moreover, a collision probability between the multiple target objects may be determined DET-CP with the aid of the image data. In addition, a signal may be provided PROV-CP in dependence upon the collision probability.

The schematic representations shown in the described figures do not depict any scale or size relationships.

Finally, it is pointed out once again that the methods and apparatuses described in detail above are merely exemplary embodiments that may be modified by the person skilled in the art in a wide variety of ways without leaving the scope of the invention. Furthermore, the use of the indefinite article "a" or "an" does not exclude that the relevant features may also be present in a plurality. Likewise, the terms "unit" and "element" do not exclude that the relevant components consist of multiple interacting part components that may also be spatially distributed where appropriate.

It is to be understood that the elements and features recited in the claims may be combined in different ways to produce new claims that likewise fall within the scope of the present invention. Thus, whereas the dependent claims depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A monitoring system for monitoring at least one target object in a medical environment, the at least one target object comprising at least one of a moveable medical object or an examination object, the monitoring system comprising:

a camera unit comprising a suspension facility and a cable-suspended camera, wherein the suspension facility comprises at least one cable and at least two cable mountings, wherein the cable mountings hold the at least one cable at a respective point in a room, wherein the suspension facility further comprises a camera mounting that holds the cable-suspended camera on the at least one cable, wherein the cable-suspended camera comprises a mono-camera and/or a stereo-camera and/or a depth camera and includes a field of view and is configured to capture the field of view, wherein the cable-suspended camera is re-positioned by moving the at least one cable with regard to the cable mountings and/or by moving the cable-suspended camera with regard to the at least one cable;

at least one further camera comprising a further mono-camera and/or a further stereo-camera and/or a further depth camera, wherein the at least one further camera has a further field of view and is configured to capture further image data of the further field of view; and a processing unit configured to control the cable-suspended camera in such a manner that in a first operational state of the monitoring system the at least one target object is arranged in the field of view and the cable-suspended camera captures first image data including a map of the at least one target object, wherein the processing unit is configured to check whether the at least one target object is mapped in the first image data that has been captured by the cable-suspended camera and is configured so as to control the movement of the camera mounting and/or the movement of the cable mountings, in such a manner that the at least one target object is arranged in field of view of the cable-suspended camera and the cable-suspended camera captures the first image data of the at least one target object, wherein the processing unit is configured to check by applying object recognition and/or pattern recognition and/or segmentation to the first image data;

wherein in the first operational state of the monitoring system the at least one further camera is positioned in such a manner that the at least one target object is arranged in the further field of view, the at least one further camera captures further image data of the at least one target object from a further mapping direction, and the processing unit controls the cable-suspended camera in such a manner that the cable-suspended camera captures the first image data from a first mapping direction which is different from the further mapping direction and has a predetermined angle with regard to the further mapping direction;

wherein, the processing unit is configured to re-construct a three-dimensional representation of the at least one target object with the first image data and the further image data.

2. The monitoring system of claim 1, wherein, the suspension facility comprises multiple cables and at least three cable mountings, wherein the cable mountings hold the multiple cables at a respective point in the room, wherein the camera mounting holds the cable-suspended camera on the multiple cables, wherein the cable-suspended camera is re-positioned by moving at least one of the multiple cables with regard to the cable mountings and/or by moving the cable-suspended camera with regard to the at least one of the multiple cables.

3. The monitoring system of claim 1, wherein the camera mounting holds the cable-suspended camera on the at least one cable in a rotatable manner and/or in a pivotable manner with regard to the at least one cable.

4. The monitoring system of claim 1, wherein the camera unit is configured to provide the captured image data to the processing unit, wherein the processing unit is configured with the first image data to identify a phase of a medical procedure which is mapped in the first image data, wherein the processing unit is configured to control the re-positioning of the cable-suspended camera additionally in dependence upon the identified phase.

5. The monitoring system of claim 1, wherein the camera unit is configured to provide the captured image data to the processing unit, wherein the processing unit is configured to:

identify further objects which are mapped in the first image data, and control the re-positioning of the cable-suspended camera in a collision-free manner with regard to the further objects.

6. The monitoring system of claim 1, wherein the processing unit is configured to control the cable-suspended camera in such a manner that at least in a first operational state of the monitoring system:

multiple target objects that are to be captured by the cable-suspended camera are arranged in the field of view, and the cable-suspended camera captures the first image data having a map of the multiple target objects.

7. The monitoring system of claim 6, wherein the camera unit is configured to provide the captured image data to the processing unit, wherein the processing unit is configured to:

determine a collision probability between the multiple target objects with the first image data, and provide a signal in dependence upon the collision probability.

8. The monitoring system of claim 7, wherein the processing unit is configured to provide the signal to the moveable medical object and to control a movement of the moveable medical object by the signal.

9. The monitoring system of claim 1, wherein the medical environment comprises the room, wherein the at least one target object is arranged in one operational state of the monitoring system in the room, wherein the cable mountings are fastened to a side wall and/or ceiling of the room.

10. A method for monitoring at least one target object by a monitoring system, the at least one target object comprising at least one of a moveable medical object or an examination object, the method comprising:

receiving a treatment plan comprising information for multiple phases of a procedure, the information including at least spatial position and/or orientation and/or pose, of the at least one target object and/or of the further objects and/or of a medical operator for the multiple phases;

capturing, for a first phase of the multiple phases, first image data having a map of the at least one target object, wherein capturing comprises:

capturing initial image data of a field of view of a cable-suspended camera by the cable-suspended camera, wherein a position of the cable-suspended camera is determined based on the information in the treatment plan, capturing further image data of the at least one target object from a further mapping direction by a further camera;

checking with the initial image data whether the at least one target object is arranged within the field of view, wherein checking comprising applying object recognition and/or pattern recognition and/or segmentation to the first image data, wherein if at least one target object is not arranged within the field of view, the cable-suspended camera is re-positioned and capturing and checking are repeated, wherein the cable-suspended camera is positioned and/or re-positioned to capture the first image data in such a manner that the cable-suspended camera captures the first image data from a first mapping direction which is different from the further mapping direction and has a predetermined angle with regard to the further mapping direction, wherein if the at least one target object is arranged within the field of view, the initial image data is provided as the first image data; and repeating capturing of second image data for a second phase of the multiple phases.

11. The method of claim 10, wherein the cable-suspended camera is re-positioned in such a manner that multiple target objects that are to be captured are arranged in the field of view of the cable-suspended camera, wherein the first image data having a map of the multiple target objects is captured, wherein a collision probability between the multiple target objects is determined with the first image data, wherein a signal is provided in dependence upon the collision probability.

12. A non-transitory computer implemented storage medium that stores machine-readable instructions executable by at least one processor, the machine-readable instructions comprising:

controlling a cable-suspended camera in such a manner that in a first operational state of a monitoring system an at least one target object is arranged in a field of view of the cable-suspended camera, the at least one target object comprising at least one of a moveable medical object or an examination object, wherein the cable-suspended camera comprises a mono-camera and/or a stereo-camera and/or a depth camera; and capturing first image data having a map of the at least one target object, wherein capturing comprises:

capturing initial image data of the field of view of the cable-suspended camera by the cable-suspended camera, capturing further image data of the at least one target object from a further mapping direction by a further camera; and checking with the initial image data whether the at least one target object is arranged within the field of view, wherein checking comprising applying object recognition and/or pattern recognition and/or segmentation to the first image data, wherein if at least one target object is not arranged within the field of view, the cable-suspended camera is re-positioned and capturing and checking are repeated, wherein the cable-suspended camera is positioned and/or re-positioned to capture the first image data in such a manner that the cable-suspended camera captures the first image data from a first mapping direction which is different from the further mapping direction and has a predetermined angle with regard to the further mapping direction, wherein if the at least one target object is arranged within the field of view, the initial image data is provided as the first image data.

13. The non-transitory computer implemented storage medium of claim 12, wherein a phase of a medical procedure is identified that is mapped in the first image data, wherein the cable-suspended camera is re-positioned additionally in dependence upon the identified phase.

\* \* \* \* \*